May 15, 1934.  K. D. STEWART  1,958,772

ARTICLE HOLDER

Filed May 14, 1932

INVENTOR.
Kenneth D. Stewart
BY
George B. Ingersoll
ATTORNEY.

Patented May 15, 1934

1,958,772

UNITED STATES PATENT OFFICE 1,958,772

ARTICLE HOLDER

Kenneth D. Stewart, Detroit, Mich.

Application May 14, 1932, Serial No. 611,286

17 Claims. (Cl. 24—257)

My invention relates to article holders in which the article is frictionally held therein; and the objects of my invention are, first, to provide a holder which will permit the holding of articles of a wide range of sizes; second, to provide an article holder having resilient jaw portions; third, to provide an article holder having jaw members of rubber composition; fourth, to provide an article holder having jaws of light weight capable of supporting heavy articles; fifth, to provide a holder having a pair of cantilever arms adapted to grip the article to be held; and sixth, to provide an article holder having a resilient grip member secured from movement at one of its ends and adapted for movement at the other of its ends.

I attain these objects by the mechanism illustrated in the accompanying drawing, in which—

Figure 5:
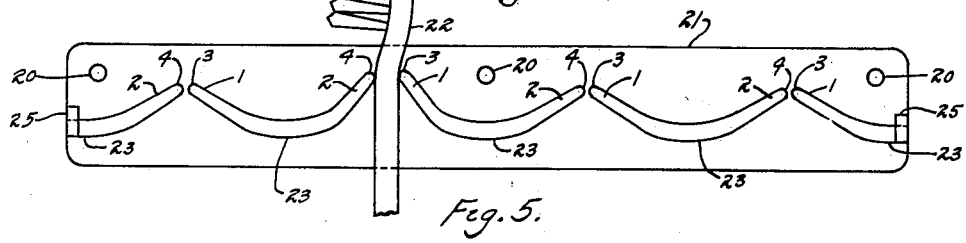
Figure 2:
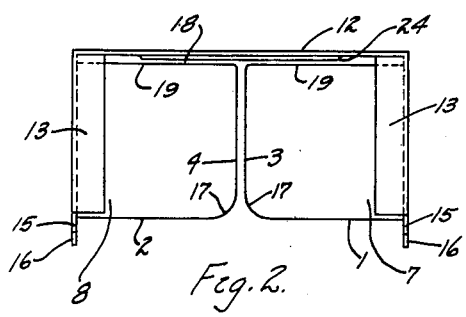
Figure 4:
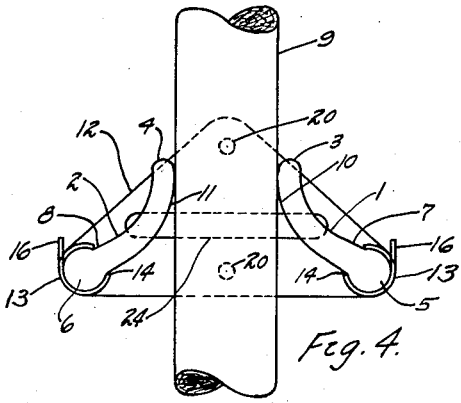
Figure 1:
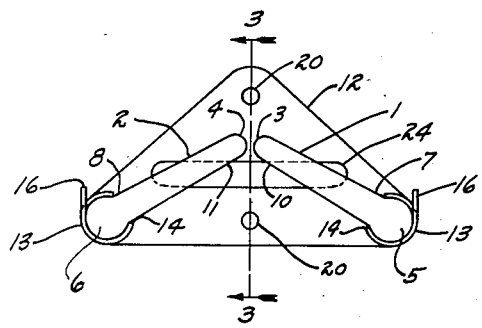
Figure 3:
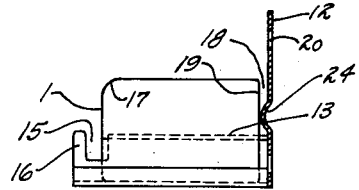

Figure 1 is a front elevation of the article holder; Fig. 2, a plan view of the article holder; Fig. 3, a sectional view of the article holder taken on the line 3—3, Fig. 1; Fig. 4, a front elevation of the holder with an article supported therein, the article having a relatively large handle portion; Fig. 5, a front elevation of the holder adapted for use in holding a plurality of articles having relatively small handle portions; and Fig. 6, a plan view of the article holder disclosed in Fig. 5.

Similar numerals refer to similar parts throughout the several views.

The jaw members or lever arms 1 and 2 may be identical and are preferably constructed of resilient material such as rubber composition, the jaw members 1 and 2 thus being adapted to be displaced to automatically accommodate articles having either small or large handle portions or similar portions for insertion between said jaw members. The jaw members 1 and 2, when made of rubber or similar composition, may be molded to provide their gripping ends 3 and 4 with rounded end portions which are connected with the base portions 5 and 6, by a gradually increasing section which preferably have their thickest portions at 7 and 8 where they join the base portions 5 and 6. It will thus be noted that the jaw members 1 and 2 are capable of supporting heavy articles having either large or small portions for insertion between said jaw members, the tapered section of the jaw members 1 and 2, together with their inclined positions relative to one another, thus enabling the jaw members 1 and 2 to act as cantilever arms having their greatest bending moments occurring at the points of maximum section and also permitting a portion of the resultant load thrust to be absorbed in a line extending approximately longitudinally of the jaw members 1 and 2.

The jaw members 3 and 4 may be located as in Figs. 1 and 2, with a very small clearance therebetween or they may actually contact with each other, in their normal positions, this being especially desirable when it is desired to hold such articles as saws by their relatively thin blade portions.

When articles such as brooms, crowbars, shovels, golf clubs, umbrellas, etc., having relatively large handle or equivalent portions for insertion between the jaw members, the jaw members 1 and 2 will be distended or separated as disclosed in Fig. 4, the handle portion being indicated at 9, the jaw members 1 and 2 having been distorted so that the handle 9 is being gripped and contacted by the lower wall surfaces 10 and 11 of the jaw members 1 and 2, the ability of the jaw members 1 and 2 thus rendering themselves especially adaptable for accommodating handle or supporting portions of widely varying shapes, contours, and weights. Where it is desired to support articles of both light and heavy weights in the same holder, the holder assembly should be constructed to support the heaviest article, and this is best accomplished by preferably constructing the bracket portion of the holder with a flange 12, made of metal or equivalent material, the flange 12 being provided with the portions 13, extending approximately at right angles thereto, the portions 13 being provided with open ends to permit the base portions 5 and 6, of the jaw members 1 and 2, to be inserted therein, the base portions 5 and 6 being made of sufficient size as to snugly fit therein, or if desired, the walls of the portions 13 may be hammered or otherwise forced together to clamp the base portions 5 and 6. The portions 13 are also provided with the openings 14 through which extend the lever portions of the jaw members 1 and 2. The portions 13 may extend beyond the outer side edges of the jaw members 1 and 2, and may have its upper wall portion cut away to provide the slot 15, the outer portion of said upper wall portion being bent upwardly, as at 16, to provide a hook for supporting additional articles thereon.

The jaw members 1 and 2 may have their outer corners rounded as at 17 to permit the easy insertion of handles, etc., therebetween. Also the jaw members 1 and 2 and the portions 13 may be constructed of sufficient width or size as to permit the existence of the space 18 between the inside edges 19 of the jaw members 1 and 2 and the surface of the flange 12, thus preventing frictional engagement of the jaw members 1 and 2 with the vertical surface of the flange 12. The flange 12 may be provided with the holes 20 for attaching to wall and equivalent surfaces.

Figure 6:
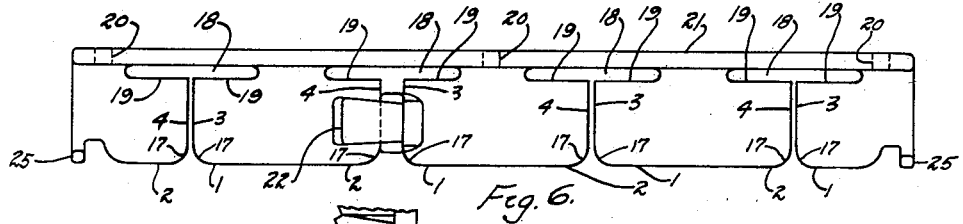

When it is desired to construct my article holder for small articles, such as tooth brushes, pens, pencils, and small instruments or utensils of similar character and when it is desired that such instruments and utensils shall be supported in groups, the holder may be manufactured with its flange 21 constructed integrally with and of the same material as the jaw members 1 and 2 as disclosed in Figs. 5 and 6, in which holder is indicated a tooth brush 22 as the supported article. The flange 21 is preferably constructed, in this case, with a heavier wall section than would be necessary where the metal flange 12 is used.

The integral construction of the flange 21 with the jaw members 1 and 2 is especially adaptable for molding the holder from rubber or similar composition material.

It is to be noted that the jaw members 1 and 2, Figs. 5 and 6, will taper from their gripping ends 3 and 4 to a thicker wall section 23 which will be integrally joined to the flange 21, the thicker wall section 23 extending between the ends of the spaces 18 which will be formed between the flange 21 and the inside edges 19 of the jaw members 1 and 2 in a similar manner as disclosed in Figs. 1, 2, 3 and 4.

The flange 12 of the holder in Figs. 1, 2, 3 and 4 may be constructed with the offset rib portion 24 to further strengthen said flange 12. The holder, as disclosed in Figs. 5 and 6, may be provided with the extension portions 25 to provide hooks similar in character and use as the hook portions 16 of the holder as disclosed in Figs. 1, 2 and 3.

I claim:

1. In an article holder, the combination of a pair of lever members having movable ends located adjacent one another for gripping the article to be held, said lever members having their other ends constructed to permit entry between flanges of a supporting bracket, and a supporting bracket having flanges gripping oppositely disposed surfaces of said ends of said lever members to secure said ends against movement between said flanges of said supporting bracket, said supporting bracket being provided with a single flange portion extending adjacent one side edge only of each of said lever members, said single flange portion being connected to said flanges gripping said ends of said lever members, said lever members being unenclosed at the upper and lower sides of their movable portions and at their outermost side edges relative to said flange.

2. In an article holder, the combination of a single flange provided with portions extending approximately at right angles thereto for anchoring lever members, and a pair of lever members provided with gripping portions made of rubber composition material, each of said lever members having a portion thereof anchored to said right angularly extending portions in such manner as to restrain said anchored portion of said lever member from movement as a lever member, said lever members having their upper ends adjacent one another, said lever members having their gripping portions unobstructed by said flange and its lever supporting portions to permit said gripping portions to receive an article therebetween when said article is moved at right angles with and toward said flange, said lever members having movement in a plane extending parallel with said flange.

3. In an article holder, the combination of a single flange, a pair of resilient jaw members each having a secured end together with a free end provided with a surface for gripping the article to be held, said resilient jaw members having the gripping surfaces of their free ends adjacent one another, each of said resilient jaw members being further provided with a decreased section adjacent its secured end, the junction of said decreased section with said secured end forming shoulders, and means for securing one of the ends of each of said resilient jaw members, said means being connected with said single flange, said means contacting the shoulders of said resilient jaw members.

4. In an article holder, the combination of a bracket provided with a pair of jaw portions having inwardly facing open sides, and resilient lever members fixedly secured at their outer ends between said jaw portions of said bracket, said lever members having inner portions provided with surfaces for gripping the article to be held, said inner portions being adapted for movement, said lever members having their outer ends secured against movement relative to said bracket by said jaw portions of said bracket, the movement of said inner portions of said lever members being limited only by the resiliency of said inner portions.

5. In an article holder, the combination of a bracket having a flange provided with a pair of oppositely disposed portions extending therefrom, and resilient lever members each having an end frictionally held against movement by the oppositely disposed portions of said bracket, said resilient members having a uniform width for their full length, said resilient members further having a plurality of thicknesses throughout their length, said resilient members having adjacent ends capable of being distorted by an article held therebetween.

6. In an article holder, the combination of a bracket having a flange provided with two pairs of portions extending therefrom, and a pair of resilient members each having an end portion solely secured by friction between a pair of said portions extending from the flange of said bracket, said resilient members having adjacently located ends for gripping the article to be held, said resilient members having their secured end portions deformed by said portions extending from said flange.

7. In an article holder, the combination of a bracket having a single flange, said bracket being further provided with portions extending approximately at right angles to said flange, and resilient members having ends fixedly secured to the portions extending from the flange of said bracket, said resilient members having a varying thickness throughout their lengths, said resilient members having adjacent ends for gripping the article to be held, the adjacent ends of said resilient members being distorted from their normal contour to a plurality of contours according to the size of the article gripped therebetween.

8. In an article holder, the combination of a flange provided with two pairs of portions extending therefrom, said flange and said pairs of portions forming a U shaped bracket adapted to receive the article to be held through its open side, and resilient members each fixedly secured to one pair of said portions, said resilient members being adapted to grip the article to be held.

9. In an article holder, the combination of a flange provided with extension portions each having a chamber therein, said chamber being open at one of its ends to receive a member, the chamber of each of said extension portions being open at one side, and members each having ends secured against movement within each of the chambers of the extension portions of said flange, said members having their other ends adapted for movement to and from one another.

10. In an article holder, the combination of a flange, and a pair of rubber composition members secured thereon, said rubber composition members having their inner ends located adjacent one another, said rubber composition members having their outer ends secured to said flange against movement, said rubber composition members having a tapering thickness between their inner ends and their secured outer ends.

11. In an article holder, the combination of a flange provided with extension portions extending approximately at right angles thereto, said extension portions having wall portions, said wall portions being provided with an opening along their inner sides, and resilient jaw members having ends clamped in the extension portions of said flange, said jaw members extending through the openings in the wall portions of the extension portions of said flange, said resilient jaw members having their other ends located adjacent one another, said last mentioned ends of said resilient jaw members being adapted for movement.

12. In an article holder, the combination of a flange having a relatively thin section, said flange being provided with extension portions together with an offset portion to form a rib extending between said extension portions to strengthen said flange, and resilient jaw members secured in the extension portions of said flange, said resilient jaw members extending adjacent the offset rib portion of said flange.

13. In an article holder, the combination of a base, a pair of oppositely disposed portions extending from said base, said portions each having a pair of wall portions for clamping the opposed surfaces of a resilient member, and a pair of resilient members each having the opposed surfaces of one of its ends clamped between the pair of wall portions of said oppositely disposed portions extending from said base, said pair of resilient members having ends adapted to grip the article to be held.

14. In an article holder, the combination of a bracket member provided with extension portions and a pair of resilient members, each supported solely at one of its ends by said extension portions, each of said resilient members extending from one of said extension portions approximately in a straight line, each of said resilient members having a continuous rectangular periphery about its side of maximum area, each of said resilient members having a varying thickness adjacent its unsupported end.

15. In an article holder, the combination of a triangular shaped flange provided with extension portions at oppositely disposed corners thereof, each of said extension portions being provided with oppositely disposed wall portions adapted to receive a member therebetween and resilient members fixedly secured between the oppositely disposed wall portions of said extension portions, said resilient members each having end portions adapted to grip the article to be held.

16. In an article holder, the combination of a bracket-member having a pair of portions each provided with a channel extending therethrough, said channel being provided with an open side having a width less than the width of said channel at its maximum point, and a resilient member fixedly supported in each of the channels of said portions, said resilient members having portions adapted to grip the article to be held.

17. In an article holder, the combination of a bracket member provided with a pair of oppositely disposed portions for supporting members thereon, and a pair of rubber composition members, each fixedly supported, at one of their ends only, on one of said portions of said bracket, each of said rubber composition members having their remaining ends free to grip the article to be held, the edges of the gripping ends of said rubber composition members extending unbrokenly in parallel planes throughout their total gripping length.

KENNETH D. STEWART.